June 5, 1951 — J. B. ULLRICH — 2,556,124
BERRY BOX HOLDER
Filed May 12, 1947
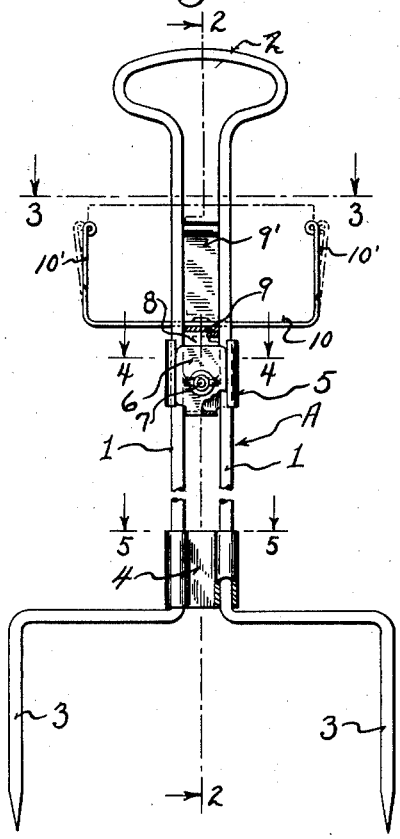
Fig. 1.
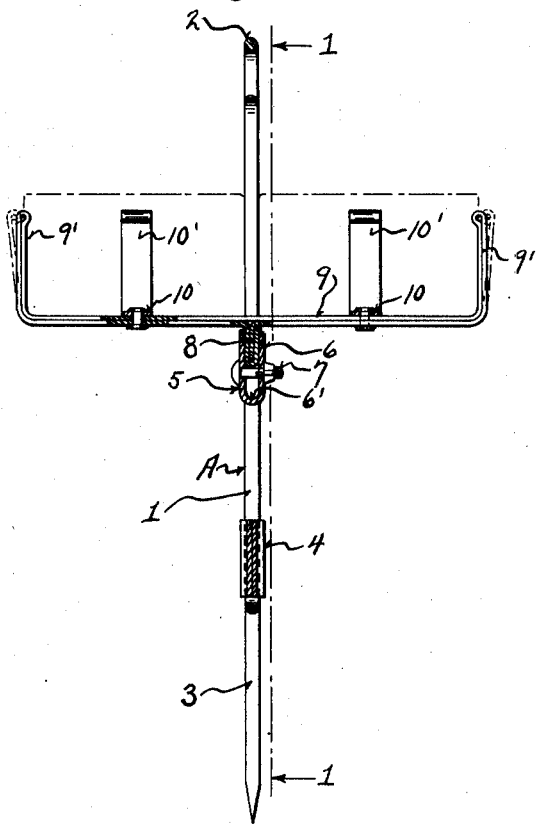
Fig. 2.
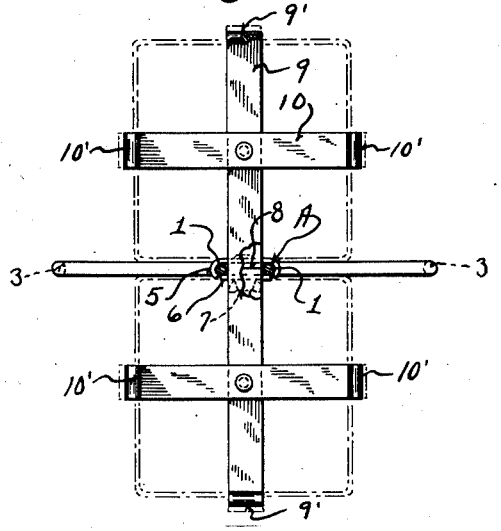
Fig. 3.
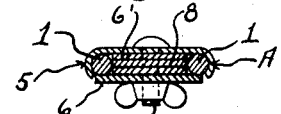
Fig. 4.
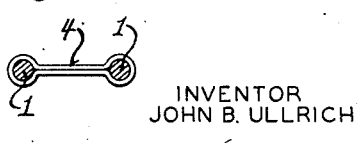
Fig. 5.
INVENTOR
JOHN B. ULLRICH
BY
ATTORNEYS Patented June 5, 1951

2,556,124

UNITED STATES PATENT OFFICE 2,556,124

BERRY BOX HOLDER

John B. Ullrich, Milwaukee, Wis.

Application May 12, 1947, Serial No. 747,533

1 Claim. (Cl. 248—156)

My invention refers to portable berry box holders for convenience in picking berries, beans or similar small fruit and vegetable products. The said holder being adopted for movement back and forth through berry fields.

The specific object of my invention is to provide a skeleton stand having a vertical adjustable box holder, whereby boxes are positioned at an approximate level with the fruit bushes or other plants to facilitate rapid harvest of such products from the bush to boxes.

A specific object of my invention is to provide a one piece stand formed from a rod having parallel stretches terminating at the upper end in a handle and at its lower end with offset prongs, whereby the stand may be anchored.

A further object of my invention is to provide a box holder having gripping fingers extending upwardly therefrom. The holder being formed from strap metal slidable between the parallel stretches of the stand.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 is a front elevation of a berry box holder, embodying the features of my invention, the same being partly in section as indicated by line 1—1 of Figure 2.

Figure 2 is a sectional side elevation of the same, the section being indicated by line 2—2 of Figure 1.

Figure 3 is a planned sectional view of the holder, the section being indicated by line 3—3 of Figure 1.

Figure 4 is an enlarged detailed, planned sectional view of an adjustable clip mechanism, the section being indicated by line 4—4 of Figure 1.

Figure 5 is a similar sectional view, illustrating a strengthening brace plate connecting the parallel rods of the stand, the section being indicated by line 5—5 of Figure 1.

Referring by characters to the drawings, A indicates a berry box supporting stand, the same being formed from a single unit, comprising parallel rods 1—1 bowed at their upper ends to form a handle 2 and adjacent to the bottom of the rods, they are offset outwardly in right angle form terminating with a pair of prongs 3—3, which prongs are adopted to be forced into the earth for anchorage purposes, whereby the device is held against twisting.

The parallel rods 1—1 of the stand are secured adjacent to forked ends thereof by a brace plate 4 to thus add rigidity to the skeleton stand as a hold.

Slidably mounted upon the rods 1—1 of the stand is a clip 5 folded upwardly to form a lip 6 between which lip and the back portion of the clip, there is developed an open mouthed pocket 6' as clearly illustrated.

The clip is slidable upon the rod sections and secured in any pre-determined adjusted position by a bolt and thumb nut 7.

This clip forms a receiving pocket for a tongue 8 which tongue is folded upon itself and the same forms the terminal of a base strap 9 that extends between the parallel stretches of the wire rod and said strap is folded upon itself for strengthening purposes and the outer ends of the same are bent upwardly to form spring fingers 9' at the ends of the base strap.

The base strap 9 has riveted or otherwise secured thereto a pair of transversely disposed straps 10 positioned approximately half way between the fingers 9' and the rod sections, the ends of which cross straps are bent upwardly to form spring gripping fingers 10', whereby a pair of boxes, as indicated in dotted line Figure 3, are securely held in the skeleton box pockets when the same are pressed downwardly and properly seated.

From the foregoing description, it is apparent that the boxes for berries or vegetables may be conveniently carried from place to place when berries are to be picked or in fact, any small fruit or vegetable.

After these boxes have been filled, they are readily removed and empty boxes substituted therefore.

One of the important features of this invention is the arrangement whereby the box holder may be adjusted at different heights to correspond with relation to the height of the bushes from which the berries or other products are picked. Hence, the berries may be very quickly transferred from the bushes to the boxes with the least physical effort. It is also apparent that when the stand is to be positioned for a period at any one location in the picking operation, it is in a measure self supporting due to the fact that the prongs may be imbedded into the soil for anchorage purposes, and when it is desired to move from place to place, the handle of the stand being gripped, it can readily be extracted from its anchored position and moved to a fresh position. It is also apparent that without departing from the spirit of my invention, I may provide the box holder with three or more branch pockets.

I claim:

A portable box holder comprising a wire folded upon itself to form parallel rods offset at their lower ends and terminating with anchor prongs, a brace plate secured to the rods above the prongs, a skeleton box holder including a base strap extending between the rods and terminating with upstanding end fingers, a pair of transversely disposed straps secured to the base strap having upturned fingered ends, a tongue depending from the base strap, and a clip carried by the tongue, the said clip being slidably adjustable upon the rods.

JOHN B. ULLRICH.

REFERENCES CITED

The following references are of record in the file of this patent:

UNITED STATES PATENTS

| Number | Name | Date |
| --- | --- | --- |
| 917,655 | Pittmann et al. | Apr. 6, 1909 |
| 1,173,036 | Robidoux | Feb. 22, 1916 |
| 1,326,086 | Ormandy | Dec. 23, 1919 |
| 1,369,315 | Ankers | Feb. 22, 1921 |
| 1,536,678 | Karkowski | May 5, 1925 |
| 2,372,073 | Flournoy | Mar. 20, 1945 |

FOREIGN PATENTS

| Number | Country | Date |
| --- | --- | --- |
| 212,617 | Switzerland | Mar. 3, 1941 |